United States Patent
Peachey

(10) Patent No.: US 6,279,683 B1
(45) Date of Patent: Aug. 28, 2001

(54) SLIDABLE HANDLE FOR GREASE GUN HOSE

(76) Inventor: Jess S. Peachey, R.D. #1, Box 47, Reedsville, PA (US) 17084

( * ) Notice: Subject to any disclaimer, the term of this patent is extended or adjusted under 35 U.S.C. 154(b) by 0 days.

(21) Appl. No.: 09/429,450

(22) Filed: Oct. 28, 1999

Related U.S. Application Data

(60) Provisional application No. 60/105,984, filed on Oct. 28, 1998.

(51) Int. Cl.$^7$ ........................................ F16N 9/00
(52) U.S. Cl. ........................................ 184/105.2
(58) Field of Search .................. 184/36, 105.1, 184/105.2; 222/191; 239/530; 248/76

(56) References Cited

U.S. PATENT DOCUMENTS

| | | | |
|---|---|---|---|
| D. 260,597 | 9/1981 | Mathuda | D8/14.1 |
| 331,691 | * 12/1885 | Duennisch | 239/530 X |
| 601,639 | * 4/1898 | Doyle | 248/76 |
| 1,833,528 | * 11/1931 | Linton | 222/326 |
| 2,581,060 | 1/1952 | Wold | 74/2 |
| 2,591,129 | 4/1952 | Brouwer | 184/1 |
| 2,607,622 | * 8/1952 | Doepke | 239/530 X |
| 2,709,542 | * 5/1955 | Eller et al. | 222/191 X |
| 2,769,999 | 11/1956 | Sheahan | 15/327 |
| 2,810,496 | 10/1957 | Gray | 222/254 |
| 3,416,633 | 12/1968 | Swearingen | 184/1 |
| 3,964,689 | * 6/1976 | Horvath | 239/530 X |
| 4,066,146 | 1/1978 | Gresh | 184/1 R |
| 4,195,812 | * 4/1980 | Norcross | 184/105.3 X |
| 4,508,372 | * 4/1985 | White | 184/105.3 X |
| 4,528,161 | * 7/1985 | Eckert | 222/191 X |
| 4,619,298 | * 10/1986 | Broussard | 184/105.1 X |
| 4,770,613 | * 9/1988 | Hoover et al. | 184/105.2 X |
| 4,946,077 | 8/1990 | Olsen | 222/256 |
| 5,094,364 | 3/1992 | Knickerbocker | 222/148 |
| 5,188,259 | * 2/1993 | Petit | 222/63 |
| 5,311,909 | 5/1994 | Adcock | 137/899 |
| 5,350,040 | 9/1994 | Gribble | 184/105.2 |
| 5,429,209 | * 7/1995 | Shimabuku | 184/105.2 |

* cited by examiner

Primary Examiner—Rodney H. Bonck
(74) Attorney, Agent, or Firm—Webb Ziesenheim Logsdon Orkin & Hanson, P.C.

(57) ABSTRACT

The present invention relates to a handle to aid in the connection of a grease gun coupler to a grease fitting. The handle generally includes a hollow body forming a longitudinally extending bore and an outer surface, wherein a grease gun hose passes through the bore allowing the handle to be slidably moved with respect to the grease gun hose. In operation, the handle is pressed against a grease gun coupler attached to a grease gun hose and the grease gun coupler is then positioned adjacent a grease fitting. By pushing on the handle, the grease coupler is urged onto the grease fitting.

13 Claims, 2 Drawing Sheets

SLIDABLE HANDLE FOR GREASE GUN HOSE

CROSS-REFERENCE TO RELATED APPLICATION

This application claims the benefit of earlier filed U.S. Provisional Patent Application Serial No. 60/105,984, filed Oct. 28, 1998, entitled "Slidable Handle for Grease Gun Hose", which is herein incorporated by reference.

BACKGROUND OF THE INVENTION

1. Field of the Invention

The present invention relates generally to the field of lubricating devices and, more particularly, to a handle which can be slidably attached to a grease gun hose and also to a grease gun having a handle slidable along the grease gun hose.

2. Brief Description of the Prior Art

Many pieces of machinery include bearings which must be lubricated on a predetermined schedule. This lubrication generally involves greasing the bearings by manually injecting grease or a similar lubricant from a lubricating device, e.g., a grease gun, through a grease fitting on the machine and into the bearing assembly. Conventional grease guns usually include a flexible hose with a coupler at one end. To lubricate the bearings, the coupler is manually attached to the grease fitting and the grease gun operated to push grease through the hose and into the bearing assembly.

While generally acceptable for lubricating bearings, there are limitations associated with such conventional grease guns. For example, after prolonged use, the grease gun hose tends to become greasy or oily to the touch. Therefore, anyone gripping or handling the hose to place the hose onto the fitting will get his hands or clothes greasy. Additionally, to engage the hose coupler with the grease fitting, it is not unusual for the coupler to have to be pressed rather forcefully against the fitting for the two pieces to engage. If the hose is slippery with grease, this can be rather difficult. Further, it is quite common for workers to grasp the hose near the middle and try to force the hose coupler onto the grease fitting. This causes the end portion of the hose near the coupler to flex and bend, leading to cracks and ruptures due to material fatigue and requiring frequent replacement of the hose.

Therefore, it would be advantageous to provide a grease gun in which contact with a greasy or dirty hose can be avoided and also in which the grease gun hose coupler can be forced against the grease fitting without the bending and flexing problems associated with grease guns of the prior art.

SUMMARY OF THE INVENTION

The present invention provides a handle which can be attached to a conventional grease gun hose and which is slidable along the hose, preferably between the coupler end to the end adjacent the grease gun. The handle includes a body forming a longitudinal bore that allows a grease gun hose to pass through the longitudinal bore. The handle is preferably one piece and substantially cylindrical in shape, but may also be formed by a plurality of pieces, e.g., two halves, which is preferably placed around the hose and fitted together in a conventional manner, e.g., snap fittings, to form the handle. The longitudinal bore is preferably larger at one end of the body than the opposite end of the body, allowing the handle to slide over a coupler connected to the hose and contact a coupler nut positioned adjacent the coupler.

One method of greasing a grease fitting involves sliding the handle along a grease gun hose toward a grease coupler positioned adjacent a second end of the grease gun hose. The next step is positioning the grease coupler over a grease fitting and pressing on the handle, forcing the grease coupler over the grease fitting. Once the grease fitting is seated, the final step is extruding grease from a canister connected to a first end of the grease gun hose, through the grease gun hose, through the grease coupler, and into an orifice formed by the grease fitting.

BRIEF DESCRIPTION OF THE DRAWINGS

A complete understanding of the invention will be obtained from the following description when taken in connection with the accompanying drawing figures wherein like reference numbers identify like parts throughout.

DETAILED DESCRIPTION OF THE PREFERRED EMBODIMENTS

Figure 1:
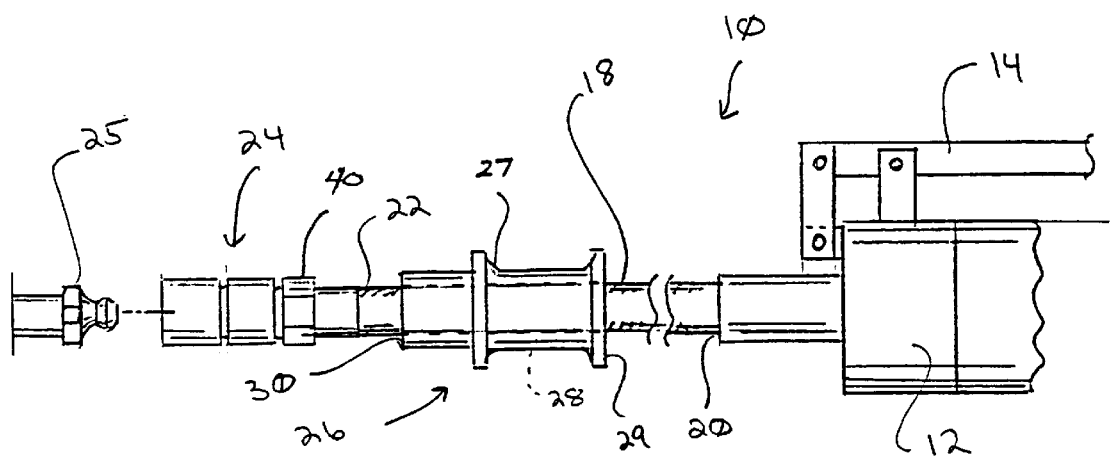
FIG. 1 is a broken side view of a grease gun with a first embodiment of a handle of the invention.

For purposes of the description hereinafter, the terms "right", "left", "above", "below" and similar spacial indicators shall relate to the invention as it is oriented in the drawing figures. However, it is to be understood that the invention may assume various alternative variations and step sequences, except where expressly specified to the contrary. It is also to be understood that the specific apparatus and processes illustrated in the attached drawings, and described in the following specification, are simply exemplary embodiments of the invention. Hence, specific dimensions and other physical characteristics related to the embodiments disclosed herein are not to be considered as limiting.

Figure 3:
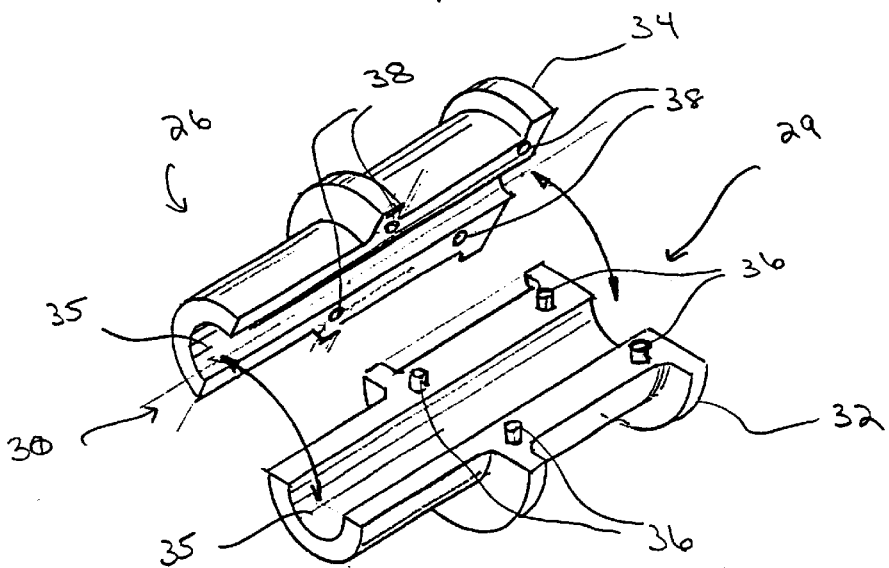
FIG. 3 is an exploded view of a grease gun handle of the invention.
Figure 4:
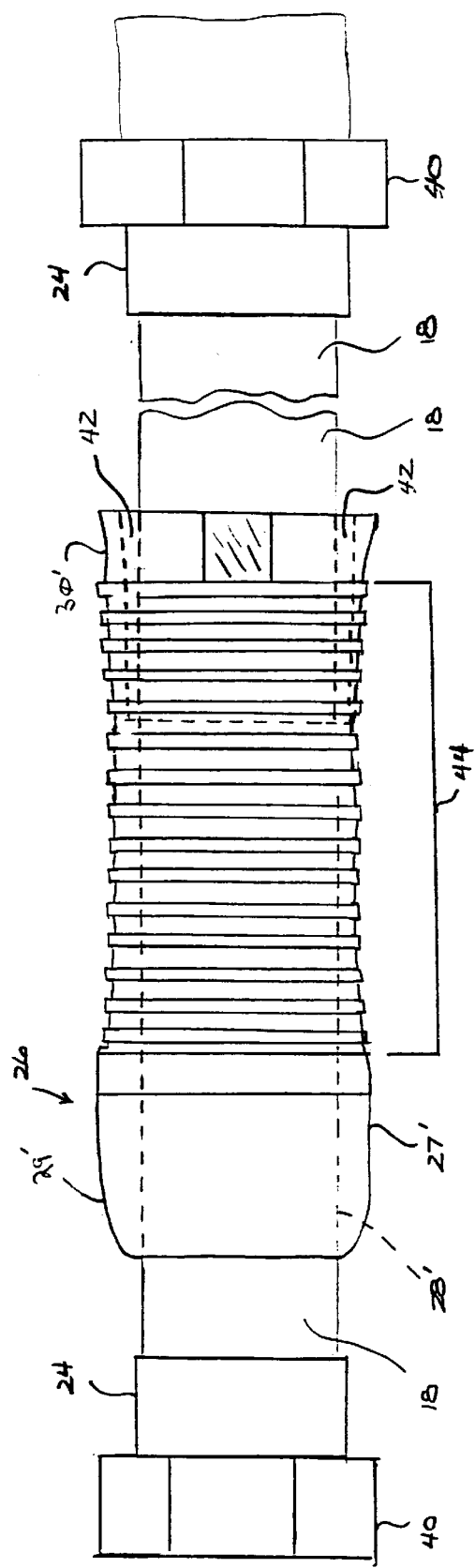
FIG. 4 is a side view of a second, preferred embodiment of the present invention.

The preferred embodiment of the present invention is generally shown in FIG. 4. However, FIGS. 1–3 are discussed first, to provide any necessary background about auxiliary parts, such as a grease gun, and the general design of the present invention.

The grease gun 10, generally shown in FIG. 1, includes a canister 12 as a source of lubricating material, such as grease. A trigger or lever 14 is connected to the canister 12 and serves to pressurize the canister 12 to force grease out of the canister 12 and into a flexible hose 18 in a conventional manner. The hose 18 is made of pliable material, such as rubber or plastic. The hose 18 has a first end 20 adjacent the canister 12 and an outer or second end 22. The first end 20 is attached to the canister 12 in a conventional manner, such as by a threaded fitting. A coupler 24 is mounted on the outer end 22 of the hose 18 opposite the canister 12. The coupler 24 has a tip, e.g., a male threaded tip, configured to engage a grease fitting 25. The structure and operation of such a grease gun 10 will be readily understood by one of ordinary skill in the art and, hence, are not discussed in detail herein.

Figure 2:
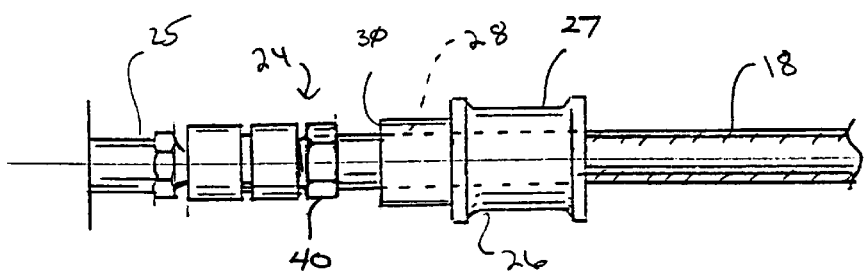
FIG. 2 is a side view of a grease gun hose coupler attached to a machine grease fitting.

A first embodiment handle 26, as shown FIGS. 1–3, is formed by a body 27. The handle 26 is mounted on the hose 18 and is preferably slidable from the first end 20 to the second end 22 of the hose 18. As shown in FIGS. 1 and 2, the handle 26 is preferably substantially cylindrical and has a longitudinal bore 28 through which the hose 18 passes. The handle 26 has a first end 29 and a second end 30 and may include an ergonomically contoured outer surface to make it easier to grip by a user. The handle 26 may be of any conventional material, such as wood, plastic, composite material or metal, e.g., aluminum. As shown in FIG. 3, the handle 26 may be formed by a plurality of pieces, such as a first handle piece or half 32 and a second handle piece or half 34. Each handle half 32, 34 has a substantially U-shaped profile when seen in end view with a longitudinal groove 35 extending along the inner surface of one of the handle halves 32, 34. The two handle halves 32, 34 are engagable, preferably reversibly engagable, to form the handle 26. For example, the first handle half 32 may include a plurality of engagement elements 36, such as projections or snap fittings. The second handle half 34 may include a plurality of engagement members 38 configured to releasably engage the engagement elements 36 on the first handle half 32 to hold the first and second handle halves 32, 34 together around the hose 18 to form the handle 26. Alternatively, other conventional coupler systems, such as screws, metal bands, nuts and bolts, etc., may be used to hold the two handle halves 32, 34 together.

As shown in FIG. 4, the preferred embodiment of the handle 26' generally includes a body 27' forming a longitudinally extending bore 28'. The bore 28' preferably has a greater diameter 42 at one end 29' of the body 27'. The body 27' further includes an ergonometric outer surface having gripping elements, such as a plurality of raised ribs 44 to help grip the handle when greasy. Like the first embodiment, the handle 26' slides along a hose 18. However, as shown further in FIG. 4, the handle 26' can be used in two ways. End 29' can be pressed against the coupler 24 or a portion thereof or, preferably, end 30' can slide over a portion of the coupler 24 and contact the coupler nut 40. Sliding over a portion of the coupler 24 is preferred because the hose 18 and coupler 24 are better supported during pressing of the coupler 24 onto a grease fitting 25. The handle 26' can be reversed on the hose if desired.

Operation of the grease gun 10 with handle 26, shown in FIGS. 1–3, will now be described. For a conventional grease gun 10, the first and second handle halves 32, 34 are placed around the hose 18 and fitted, e.g., snapped together, to form the handle 26. The bore 28 formed by the two grooves 35 has a diameter which is slightly larger than the outer diameter of the hose 18 so that the handle 26 is slidable along the length of the hose 18 from the first end 20 to the second end 22. When the grease gun 10 is needed, a user can grasp the canister 12 in a conventional manner and grip the handle 26 to position the coupler 24 as required. Thus, the user's hands need not actually come in contact with the hose 18.

Additionally, as discussed above and shown in FIG. 2, sometimes the coupler 24 must be strongly pressed against the grease fitting 25 to engage the coupler 24 with the fitting 25. With the preferred embodiment of the present invention, shown in FIG. 4, handle 26' can be slid along the hose 18 until the first end 29' passes over the inner end of the coupler 24 and contacts the coupler nut 40. Alternatively, the handle 26' can be slid along the hose 18 until the second end 30' of the handle 26' abuts the inner end of the coupler 24. Thus, either handle 26, 26' can be used to strongly press the coupler 24 against the fitting 25. Moreover, since the outer portion of the hose 18 is inside the handle 26, 26', this eliminates the bending and flexing problems common in the currently available devices, helping to reduce or eliminate the material fatigue and cracking problems associated with known grease gun hoses.

If the fitting 25 is at a difficult position to reach, e.g., behind obstructing piping or in a well on the machine, either handle 26, 26' can be slid toward the first end 20 of the hose 18 to allow the outer end 22 of the hose 18 with the coupler 24 to be bent or maneuvered into position to engage the fitting 25 in a conventional manner. Thus, the handles 26, 26' do not interfere with bending the outer portion of the hose 18 if needed to maneuver the hose 18 around an obstacle to engage the coupler 24 with the fitting 25. If the handles 26, 26' become worn or damaged, handle 26 can be slid, halves 32, 34 can be separated and the handle 26 replaced with a new handle 26 of the present invention. Handle 26' can be separated from the hose 18 by sliding the handle 26' off the hose 18 in a conventional manner and replaced with a new handle 26'. If either handle 26, 26' is not desired for a particular lubricating operation, e.g., if the hose 18 must be inserted through a restrictive or confined opening, the handles 26, 26' can be temporarily removed and then replaced when needed again.

While one embodiment of the handle 26 is formed by two handle halves 32, 34 fitted together around the hose 18, the preferred embodiment, as shown in FIG. 4, is a handle 26' with a one-piece body 27' construct, wherein the body 27' has a longitudinal bore 28' which can be slidably carried on the hose 18. For example, the first end 20 of the hose 18 can be disconnected from the canister 12, the one-piece handle 26' slipped onto the hose 18 and the first end 20 reconnected to the canister 12. The longitudinal bore 28' can also be enlarged at one end, allowing the handle 26' to slide over a coupler 24 and contact a coupler nut 40.

Although the handles 26, 26' of the invention are shown in use with a conventional lever-type grease gun, the handles 26, 26' are not limited to such lever-type grease guns but may be used with any conventional lubricating device having a flexible hose. Additionally, the handles 26, 26' can be packaged as a kit with a conventional grease gun, with other handles 26, 26' individually packaged as replacements.

Thus, the present invention provides handles 26, 26' which can be used with conventional lubricating devices, e.g., a conventional grease gun, to reduce or eliminate the limitations associated with known grease guns. The handles 26, 26' allow a user to grip and manipulate the grease gun hose without physically touching the hose. The handles 26, 26' may also be slid to the outer end of the hose to generally press against the coupler 24 to help engage the coupler 24 with a machine grease fitting without the bending and flexing problems associated with known grease gun hoses.

It will readily be appreciated by those skilled in the art that modifications may be made to the invention without departing from the concepts disclosed in the foregoing description. Such modifications are to be considered as included within the scope of the appended claims. Accordingly, the particular embodiments described in detail hereinabove are illustrative only and are not limiting as to the scope of the invention which is to be given the full breadth of the appended claims and any and all equivalents thereof.

I claim:

1. A grease gun hose and hose handle combination, comprising:
   a flexible hose having a first end and a second end; and
   a hose handle comprising a body having a bore, wherein said grease gun hose passes through said bore such that said hose handle is slidable along at least a portion of said flexible hose between said first and second ends.

2. The combination as claimed in claim 1 wherein said body includes a substantially cylindrical outer surface.

3. The combination as claimed in claim 1 wherein said body includes an ergonomically contoured outer surface.

4. The combination as claimed in claim 3 wherein said ergonomically contoured outer surface includes a plurality of raised ribs.

5. The combination as claimed in claim 1 wherein said bore has a greater diameter at one end of said body than at the other end of said body.

6. The combination as claimed in claim 1 wherein said body is made from a material selected from the group consisting of metal, plastic, wood and composite material.

7. The combination as claimed in claim 1 wherein said body is formed by a plurality of separate handle pieces.

8. The combination as claimed in claim 7 wherein said handle pieces are releasably engagable.

9. The combination as claimed in claim 8 wherein said handle includes a first handle piece having at least one engagement fitting and a second handle piece having at least one engagement member, wherein said at least one engagement fitting releasably engages said at least one engagement member.

10. A grease gun, comprising:
   a flexible hose having a first end and a second end; and
   a hose handle, comprising:
      a body; and
      a bore extending through said body and engaging said flexible hose such that said handle is slidable along at least a portion of said hose between said first end and said second end,
         wherein said body has an outer surface including gripping elements, and
         wherein said body is made from a material selected from the group consisting of metal, plastic, wood and composite material.

11. The grease gun as claimed in claim 10, wherein said handle comprises a plurality of releasably engagable handle pieces.

12. A method of engaging a grease coupler with a grease fitting comprising the steps of:
   a) sliding a handle body along a flexible grease gun hose toward a grease coupler positioned adjacent a second end of said grease gun hose, wherein said handle body includes a longitudinal bore and said flexible grease gun hose passes through said longitudinal bore;
   b) positioning said grease coupler adjacent said grease fitting;
   c) pressing said handle body toward said grease coupler;
   d) forcing said grease coupler to engage said grease fitting; and
   e) extruding grease from a source in flow communication with said grease gun hose, through said grease gun hose, through the grease coupler, and into an orifice formed by said grease fitting.

13. A method of engaging a grease coupler with a grease fitting comprising the steps of:
   a) placing a first handle piece around a flexible grease gun hose;
   b) placing a second handle piece around said flexible grease gun hose;
   c) forming a handle body by fitting said second handle piece with said first handle piece;
   d) grasping said handle body;
   e) sliding said handle body along said flexible grease gun hose toward a grease coupler;
   f) positioning said grease coupler adjacent a grease fitting;
   g) pressing said handle body toward said grease coupler;
   h) forcing said grease coupler into flow communication with said grease fitting; and
   i) extruding grease from a grease source in flow communication with said grease gun hose, through said grease gun hose, through said grease coupler, and into an orifice formed by said grease fitting.

* * * * *